(12) United States Patent
Olsson et al.

(10) Patent No.: US 6,424,769 B1
(45) Date of Patent: Jul. 23, 2002

(54) OPTOFIBRE CABLE WITH CONCENTRIC ARRAYS OF OPTICAL FIBER TUBES

(75) Inventors: Bertil Olsson, Näsviken; Tommy Cedervall; Curt Johansson, both of Hudiksvall, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/719,284
(22) PCT Filed: Jun. 14, 1999
(86) PCT No.: PCT/SE99/01055
§ 371 (c)(1), (2), (4) Date: Feb. 2, 2001
(87) PCT Pub. No.: WO99/64908
PCT Pub. Date: Dec. 16, 1999

(30) Foreign Application Priority Data

Jun. 12, 1998 (SE) .............................................. 9802108

(51) Int. Cl.[7] .................................................. G02B 6/44
(52) U.S. Cl. ....................................... 385/102; 106/114
(58) Field of Search ................................. 385/100–114

(56) References Cited

U.S. PATENT DOCUMENTS

| | | | |
|---|---|---|---|
| 4,557,558 A | | 12/1985 | Bresser |
| 4,645,298 A | * | 2/1987 | Gartside, III ............... 385/103 |
| 4,730,088 A | * | 3/1988 | Suzuki .................... 174/102 R |
| 4,783,138 A | * | 11/1988 | Oestreich ..................... 385/103 |
| 5,071,221 A | * | 12/1991 | Fujitani et al. ............. 385/100 |
| 5,325,457 A | * | 6/1994 | Bottoms, Jr. et al. ....... 385/113 |
| 5,677,974 A | * | 10/1997 | Elms et al. ................. 385/101 |
| 5,698,615 A | * | 12/1997 | Polle ...................... 385/100 X |
| 6,167,179 A | * | 12/2000 | Weiss et al. ................ 385/103 |

FOREIGN PATENT DOCUMENTS

DE 2847386 5/1980

* cited by examiner

*Primary Examiner*—Brian Sircus
*Assistant Examiner*—Son V. Nguyen
(74) *Attorney, Agent, or Firm*—Burns, Doane, Swecker & Mathis, L.L.P.

(57) ABSTRACT

A method for producing an opto cable with a central strain relief core, a glue layer on the surface of the core, a first array of optofibre-containing tubular elements bonded to the core by the glue layer, and a porous filing material filling the space between the tubular elements and the glue on the surface of the strain relief core. At least a second array of optofibre-containing tubular elements is bonded to the first array by surrounding the first array of tubular elements and the filling material with a layer of glue which bonds the second array of tubular elements to the structure. Filling material is added between the tubular elements of the second array and the layer of glue. Additional concentric arrays of glue layers, tubular elements, and filling material can be added in the same manner. A casing surrounds the outermost concentric array of tubular elements.

4 Claims, 1 Drawing Sheet

OPTOFIBRE CABLE WITH CONCENTRIC ARRAYS OF OPTICAL FIBER TUBES

FIELD OF INVENTION

The present invention relates to a method of producing an optofibre cable and an optofibre cable produced in accordance with the method, and then particularly an optofibre cable for transmitting optosignals and comprising a plurality of optofibres housed in tubular elements or pipes enclosed by a protective sheath.

BACKGROUND OF THE INVENTION

It is known in several different contexts to use optofibre cables that include optofibre-containing plastic tubular elements that are wound around and joined to a strain relief and enclosed in a protective sheath. The tubular element interspacing is filled with a filling material so as to fixate the tubular elements in the cable and to make the cable watertight along its length.

The problem with this type of optocable is that capillaries are liable to form between the filling material and the plastic tubular elements, therewith making it possible for water to enter the cable along its length. The filling material also tends to make the cable much too heavy and inflexible.

SUMMARY OF THE INVENTION

With the intention of simplifying the manufacture and handling of optofibre cables and also with the intention of preventing the ingress of water into optofibre cables connected to components, there has been produced an optofibre cable which includes one or more tubular elements that house one or more optofibres, a central strain relief connected to said tubular elements, and an intermediate porous filling material, all of which are enclosed in a protective casing in the form of a conduit means. The optofibre-containing tubular elements are glued to the strain relief. The purpose of the porous filling material is to fill the space between the tubular elements, the glue surface on the strain relief and the casing and to fixate the tubular elements around said strain relief, while still enabling the propagation of the glue connection and the function of said glue connection in making the optofibre cable watertight along its length. The use of a porous filling material means that less material is used than in known cases and therewith results in a cable of lower weight. Despite being porous, the filling material is still able to assist in mutual fixation of the plastic tubular elements in the cable and will render the cable shape-stable and watertight along its length. The glue join between the strain relief and the plastic tubular elements can be made stronger, by applying a thicker layer of glue so as to increase the contact surface area between plastic tubular elements and glue layer, therewith obtaining better adhesion and improved connection of the plastic tubular elements with the strain relief. The risk of the formation of capillaries between the plastic tubular elements, the glue layer and the filling material is also reduced with this thicker glue layer, therewith avoiding the risk of water leaking into the cable along its length. In addition to making the glue layer thicker on the strain relief, an increased use of glue will enable the plastic tubular elements to be provided with an outer glue layer instead of an outer plastic mantle, therewith enabling one or more arrays of plastic tubular elements with intermediate porous filling material to be arranged and the whole embraced by an outer protective casing, such as a plastic sheath.

The invention will now be described in more detail with reference to preferred embodiments thereof and also with reference to the accompanying drawing.

DESCRIPTION OF PREFERRED EMBODIMENTS

Figure 1:
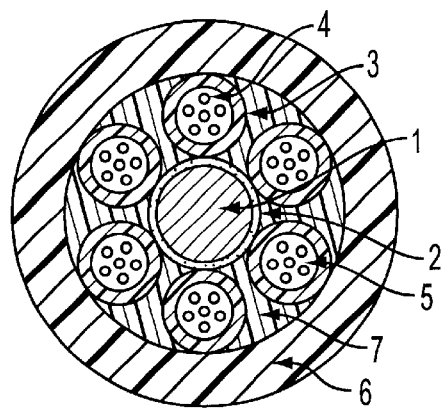
FIG. 1 is a cross-sectional view of an inventive optofibre cable comprising an array of plastic tubular elements that house optofibres.

FIG. 1 is a cross-sectional view of an inventive optofibre cable and shows the construction of said cable. The cable core 1 forms the cable strain relief, and may consist of a fiber-reinforced plastic material. In the manufacture of the cable, adhesive material, such as a glue layer 2, is applied around the core. This glue layer functions to connect the core with one or more helically applied tubular elements 3 that house optofibres 4, wherewith tension forces are transferred from the core to the tubular elements. The tubular elements 3 housing the optofibres may be comprised of a plastic material, such as a polyamide plastic, and may house one or more optofibres, for instance six or eight fibers, and may optionally also include a filler 5, such as a thixotropic gel that acts in the space between the optofibres and an inner tubular elements wall. The space is delimited by the glue-coated outer core surface, the outer surfaces of the tubular elements, and an inner surface of an enclosing sheath or casing 6 is filled with a porous filling material 7, such as a porous plastic of the TPE-type, which makes the cable watertight along its length and assists in fixating the tubular elements in the cable. The choice of a porous filling material will result in a lighter cable while still rendering the cable watertight along its length. The suppleness of the filling material will not prevent the glue joint from propagating and acting between the outer surface of the core and the outer surfaces of the tubular elements. The surrounding sheath can be made of a plastic material, such as a polyethylene plastic, and will preferably be black in colour.

The optofibre cable is produced by first winding helical plastic tubular elements 3 containing optofibres 4 around the glue-coated core 1 and the porous filling material 7 then applied, whereafter sheathing material 6 is applied.

Figure 2:
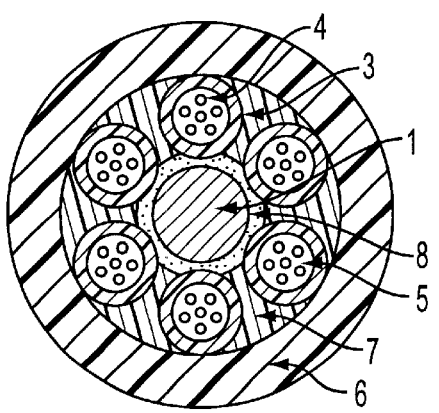
FIG. 2 is a cross-sectional view of an inventive optofibre cable having an array of optofibre-containing plastic tubular elements and a thicker glue layer.

FIG. 2 is a cross-sectional view of an optofibre cable similar to the view shown in FIG. 1, but where the glue layer on the strain relief has been made thicker and identified by the reference numeral 8. The thicker glue layer 8 will penetrate further up between the plastic tubular elements 3 as said tubular elements are fastened to the core, therewith obtaining a larger contact area between the glue layer on the core and the plastic tubular elements. The thicker glue layer 8 will not produce tapering capillaries between the plastic tubular elements and the glue layer on the core. Filling material would be unable to fill-out such capillaries, which would result in the formation of cavities in the cable and therewith enable water to penetrate into the optofibre cable along its length. The optofibre cable is constructed in the same way as the optofibre cable shown in FIG. 1 in other respects, which has been shown by the use of essentially the same reference signs.

Figure 3:
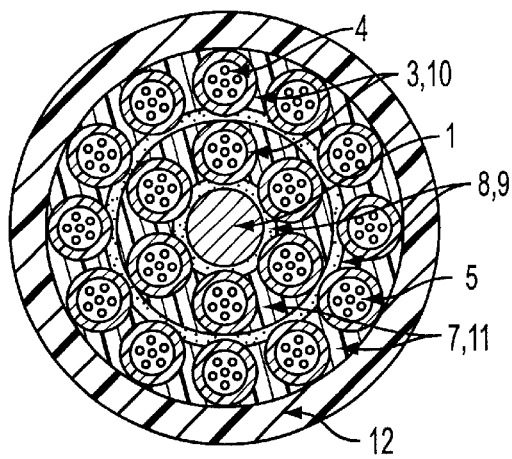
FIG. 3 is a cross-sectional view of an inventive optofibre cable that includes two arrays of optofibre-containing plastic tubular elements and thicker glue layers.

FIG. 3 illustrates a further development of the aforedescribed optofibre cable concept with the thicker glue layer 8, by virtue of applying a further thick layer of glue around the plastic tubular elements 3 and the intermediate porous filling material 7 such as to form an outer casing, wherewith the further glue layer 9 may also be joined to the plastic tubular elements 3. Several optofibre-containing plastic tubular elements 10 can then be wound helically on the glue layer 9, wherewith the thickness of said further glue layer 9 may be such as to enable the plastic tubular elements 10 to be pressed down into the layer of glue, so as to obtain a large contact surface area between the plastic tubular elements 10 and the glue layer 9 and therewith eliminate the possibility of capillaries forming between the tubular elements and said layer. The space between the plastic tubular elements 10 in the second array of tubular elements outside the glue layer can be filled with a porous filling material 11. An outer, protective plastic layer, such as a layer of black polyethylene, is then applied to the second array of plastic tubular elements and the porous intermediate filler.

Figure 4:
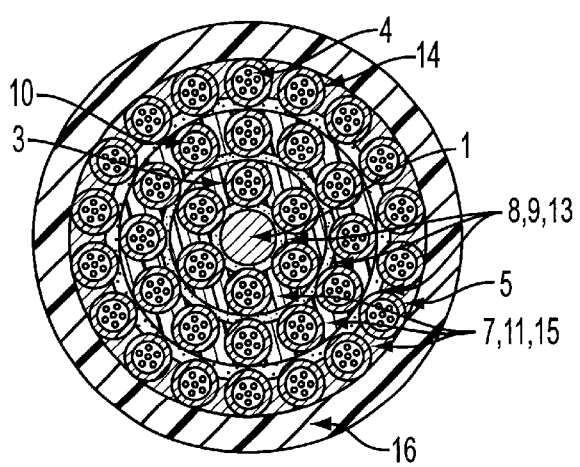
FIG. 4 is a cross-sectional view of an inventive optofibre cable that includes three arrays of optofibre-containing plastic tubular elements and thicker glue layers.

FIG. 4 is a cross-sectional view of another example of an optofibre cable that includes several concentric layers or arrays of optofibre-containing plastic tubular elements. In this embodiment, a glue layer 13 applied to the second array of plastic tubular elements 10 has been used as a foundation on which a third concentric array of optofibre-containing plastic tubular elements 14 has been applied, together with intermediate porous filler 15. The glue layer has also been made thicker, which contributes towards obtaining an improved connection between the glue layer 13 and the optofibre-containing tubular elements 14. A protective plastic layer 16, such as a layer of black polyethylene, has been applied outside the third array of plastic tubular elements 14 and intermediate porous filler 15. The mutually concentric glue layers bonded with the optofibre-containing plastic tubular elements and intermediate porous filler impart mechanical strength, shape stability and low weight to the cable, and also make the cable watertight along its length.

The concentric structure of the optofibre cable with tubular elements bonded with glue layers enables the construction of a multi-layer optofibre cable with glue layers and intermediate porous filler, where the concentric layers of porous filler between the concentric arrays of tubular elements make the optofibre cable watertight along its length while providing a lighter cable than would otherwise be the case.

It will be understood that the invention is not restricted to the aforedescribed and illustrated embodiments thereof, and that modifications can be made within the scope of the accompanying Claims.

What is claimed is:

1. A method of producing an optofibre cable intended for the transmission of optosignals comprising a plurality of tubular elements wound around a strain relief core, an outer casing, and filling material, wherein each tubular element houses at least one optofibre, the method comprising:

coating the core with glue;

winding one or more of the plurality of tubular elements around the glue-coated core such as to glue bond said one or more tubular elements to said core and therewith form on said core a first array of tubular elements;

filling the spaces between the tubular elements with a porous filling material, wherein said glue provides strain relief between the core and the one or more tubular elements, and said tubular elements being held fixated around the core by said porous filling material;

applying one or more concentric layers of glue to the first array of tubular elements and to the porous filling material;

bonding at least one concentric array having one or more tubular elements to the first array with the one or more concentric layers of glue, wherein said one or more concentric layers of glue provides strain relief between the core and the at least one concentric array;

filling the spaces between the one or more tubular elements of the at least one concentric array and the one or more concentric layers of glue with porous filling material, wherein the porous filling material fixates the one or more tubular elements in the at least one concentric array;

and encasing an outermost concentric array of tubular elements and filling material in casing material, wherein said filling material between the tubular elements of the first and the at least one concentric array makes the cable watertight along its length.

2. A method according to claim 1, further comprising:

giving the glue layers a thickness such that when winding the tubular elements of the first array around the core and when winding tubular elements of outwardly lying arrays, said tubular elements will be pressed down into the respective glue layers such as to obtain greater surface contact and binding contact between the tubular elements and the glue layers.

3. An optofibre cable for transmitting optosignals, comprising a strain relief core;

a first array of tubular elements including a least one tubular element bonded to the core by a layer of glue on a surface of the core;

porous filling material disposed in spaces between the core and the at least one tubular element;

a second, concentric array of tubular elements bonded to the first array by a layer of glue on an outside surface of the first array; and a surrounding casing, wherein the tubular elements of the first array and the second, concentric array contain at least one optofibre, and wherein strain relief is obtained between the core and the tubular elements of the first array and the second, concentric array by the layer of glue on the surface of the core and the layer of glue on the first array, and wherein the filling material functions to fixate the tubular elements in the first array and the second, concentric array and makes the optofibre cable watertight along its length.

4. An optofibre cable according to claim 3, wherein the glue layers on the strain relief core and to the first array have a thickness such that when applying the tubular elements and bonding said tubular elements the formation of capillaries will be avoided between glue layers and tubular elements while obtaining a shape stable optofibre cable that is watertight along its length.

* * * * *